(12) United States Patent
Gérardière et al.

(10) Patent No.: US 12,732,228 B2
(45) Date of Patent: Sep. 8, 2026

(54) MOTOR VEHICLE MEMBER INCLUDING A NEAR FIELD COMMUNICATION ANTENNA

(71) Applicant: Vitesco Technologies GmbH, Regensburg (DE)

(72) Inventors: Olivier Gérardière, Toulouse (FR); Michele Ciocchetta, Toulouse (FR); Nisha Patel, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 272 days.

(21) Appl. No.: 18/712,857

(22) PCT Filed: Nov. 29, 2022

(86) PCT No.: PCT/EP2022/083585

§ 371 (c)(1),
(2) Date: May 23, 2024

(87) PCT Pub. No.: WO2023/104582

PCT Pub. Date: Jun. 15, 2023

(65) Prior Publication Data

US 2024/0356584 A1 Oct. 24, 2024

(30) Foreign Application Priority Data

Dec. 9, 2021 (FR) ....................................... 2113183

(51) Int. Cl.

| | |
|---|---|
| ***H04B 5/43*** | (2024.01) |
| ***H01Q 1/22*** | (2006.01) |
| ***H04B 5/24*** | (2024.01) |

(52) U.S. Cl.

CPC ............. *H04B 5/43* (2024.01); *H01Q 1/2208* (2013.01); *H04B 5/24* (2024.01)

(58) Field of Classification Search

CPC ... H04B 5/20; H04B 5/24; H04B 5/28; H04B 5/40; H04B 5/43; H01Q 1/12; H01Q 1/18;

(Continued)

(56) References Cited

U.S. PATENT DOCUMENTS 7,589,431 B2 * 9/2009 Hentsch .................. E05B 77/04 307/10.1
11,214,991 B2 * 1/2022 Gabriel ................... E05B 81/76

(Continued)

FOREIGN PATENT DOCUMENTS

JP 2009102873 A 5/2009

OTHER PUBLICATIONS

International Search Report (PCT/ISA/210) with translation and Written Opinion (PCT/ISA/237) mailed on Feb. 16, 2023, by the European Patent Office as the International Searching Authority for International Application No. PCT/EP2022/083585 (16 pages).

*Primary Examiner* — Quochien B Vuong
(74) *Attorney, Agent, or Firm* — Buchanan Ingersoll & Rooney P.C.

(57) ABSTRACT

A motor vehicle member including a support, an electrically conductive coating deposited on the support and having an outer edge, and a near field communication antenna. The electrically conductive coating includes: at least a first opening, having an inner edge and arranged at least partially opposite the near field communication antenna; and at least a second opening, extending from the inner edge of the at least first opening to the outer edge of the electrically conductive coating. A cover partially covers the electrically conductive coating, so as to conceal the openings and to reveal at least a part of the electrically conductive coating.

13 Claims, 2 Drawing Sheets

(58) Field of Classification Search
CPC ........ H01Q 1/22; H01Q 1/2208; E05B 81/54; E05B 81/64; E05B 81/76; E05B 81/77; E05B 85/10
See application file for complete search history.

(56) References Cited

U.S. PATENT DOCUMENTS

| | | | | |
|---|---|---|---|---|
| 11,382,208 | B2 * | 7/2022 | Sieg | E05B 81/77 |
| 12,030,442 | B2 * | 7/2024 | Sieg | H01Q 1/3283 |
| 2010/0237635 | A1 | 9/2010 | Ieda et al. | |
| 2017/0012343 | A1 | 1/2017 | Wang et al. | |
| 2018/0144861 | A1 | 5/2018 | Song et al. | |
| 2019/0226248 | A1 * | 7/2019 | Kalesse | H01Q 1/3241 |

* cited by examiner

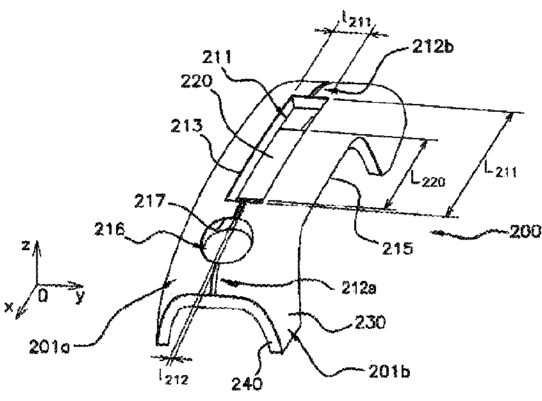
Fig 4
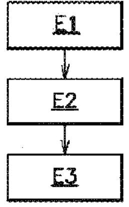
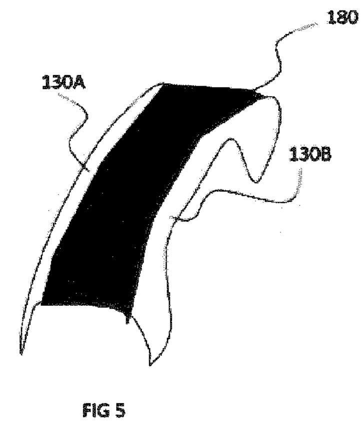
FIG 5

MOTOR VEHICLE MEMBER INCLUDING A NEAR FIELD COMMUNICATION ANTENNA

CROSS REFERENCE TO RELATED APPLICATIONS

This application is the U.S. National Phase Application of PCT International Application No. PCT/EP2022/083585, filed Nov. 29, 2022, which claims priority to French Patent Application No. 2113183, filed Dec. 9, 2021, the contents of such applications being incorporated by reference herein.

TECHNICAL FIELD OF THE INVENTION

The invention relates to a motor vehicle member comprising a near field communication (NFC) antenna. The member is designed to be approached by a near field communication system capable of communicating with the near field communication antenna, and comprises a support, made of plastic material for example.

BACKGROUND OF THE INVENTION

In the prior art there are known motor vehicle members provided with near field communication antennas, notably, but not exclusively, motor vehicle door handles.

Throughout the text, “near field communication antenna” is taken to mean a winding of one or more turns, configured to have an electric current flowing through it and thus generate a magnetic field which decreases very markedly with the distance to the antenna. Such a near field communication antenna is designed to exchange data, by magnetic coupling, with a second near field communication antenna located in an ancillary system such as a smartphone or a badge. These data take the form of electromagnetic signals. These data preferably comprise identification data of a human operator, the aim being to make access to the motor vehicle conditional on the identification of an authorized individual.

In the automotive field it is also known to make use of metallic coatings for purely esthetic purposes. Such coatings may be applied, notably, to door handles of motor vehicles. In the prior art, these coatings are not found opposite a near field communication antenna in a motor vehicle.

One aspect of the present invention is a motor vehicle member comprising a near field communication antenna and also having a metallic coating designed to be at least partially visible from the outside of the motor vehicle.

SUMMARY OF THE INVENTION

For this purpose, an aspect of the invention thus relates, in its widest sense, to a motor vehicle member, said member comprising:

- a support;
- an electrically conductive coating at least partially covering said support, designed to be at least partially visible from the outside of the motor vehicle, and having an outer edge; and
- a near field communication antenna.

According to an aspect of the invention, the electrically conductive coating comprises:

- at least a first opening having an inner perimeter and arranged at least partially opposite the near field communication antenna; and
- at least a second opening, extending from the inner edge of said at least first opening to the outer edge of the electrically conductive coating, so as to prevent an electric current from flowing in said electrically conductive coating around the whole of said first opening.

The member according to an aspect of the invention is designed to be approached by a near field communication system for the establishment of a data exchange by magnetic coupling. Said near field communication system may be a smartphone provided with an NFC antenna, or any other device having an NFC antenna enabling it to communicate with the near field communication antenna included in the member according to an aspect of the invention. The near field communication antenna is capable of communicating with said near field communication system.

The support is made, for example, of plastic material. It is capable of receiving an electrically conductive material.

Thus an aspect of the present invention responds to the aim, namely of proposing a motor vehicle member comprising a near field communication device and also having an electrically conductive coating designed to be at least partially visible from the outside of the motor vehicle.

The electrically conductive coating comprises at least one layer of metal. It may consist entirely of this at least one layer of metal. It has an esthetic function, notably due to its color and/or its brilliance. Its outer edge may also be referred to as the “outer perimeter”, “external perimeter”, “external boundary”, “outer contour” or even “external edge face”. The outer edge extends along a line delimiting a surface over which the electrically conductive coating extends. Said edge is referred to as outer because it extends all around the electrically conductive coating, rather than being surrounded by the latter. Said surface over which the electrically conductive coating extends may be flat. As a general rule, however, this surface is not flat, and is preferably convex in the opposite direction from the near field communication antenna.

According to an aspect of the invention, each second opening extends from the inner edge of said at least first opening to the outer edge of the electrically conductive coating. In other words, each second opening passes through the electrically conductive coating from side to side, from the first opening to the outer edge of the coating, so as to open an electrical path which would otherwise extend around the first opening.

The electrically conductive coating forms a screen that can block the passage of the electromagnetic waves emitted by the near field communication antenna in use.

To enable these waves to travel between said near field communication antenna and the outside, the member according to an aspect of the invention is therefore provided with said first opening, located at least partially opposite the near field communication antenna. Preferably, the support according to an aspect of the invention is also provided with a through opening the contour of which preferably matches that of the first opening formed in the electrically conductive coating.

The inventors have noticed that, in a member in which the near field communication antenna is surmounted by an electrically conductive coating pierced by the first opening alone, the phenomenon described below occurs. The electromagnetic field generated by the near field communication antenna generates induced currents that flow in the electrically conductive coating all around said first opening. These induced currents themselves create an induced electromagnetic field, which opposes the electromagnetic field emitted by the near field communication antenna. A resultant electromagnetic field, corresponding to the sum of the electromagnetic field generated by the near field communication antenna and the induced electromagnetic field, therefore has a very small amplitude. Thus the presence of the electrically conductive coating over the near field communication antenna interferes considerably with the emission of the signal by the latter. In particular, the presence of the electrically conductive coating over the near field communication antenna makes it impossible to obtain a sufficient signal intensity outside such a member.

The inventors then had the idea of providing the electrically conductive coating with at least a second opening. The second opening extends from an inner edge of the first opening to an outer edge of the electrically conductive coating, thus cutting an electrical path formed around the first opening. Owing to said second opening, the aforementioned induced currents are prevented from flowing in a loop around the whole of said first opening. Thus the creation of the aforementioned induced electromagnetic fields is prevented.

An aspect of the invention thus makes it possible to propose a motor vehicle member comprising a near field communication device also having a metallic coating designed to be at least partially visible from the outside of the motor vehicle, and capable of emitting a high-intensity near field communication signal toward the outside of the member and the motor vehicle.

In other words, an aspect of the invention makes it possible to reduce or even eliminate electromagnetic interference that is caused by the electrically conductive coating in opposition to the electromagnetic field radiated by a near field communication antenna.

According to an aspect of the invention, the member further comprises a cover, assembled onto said support and partially covering the electrically conductive coating, so as to conceal the first opening and the second opening and to reveal at least a part of the electrically conductive coating.

This arrangement makes it possible to reveal only certain parts of the electrically conductive coating, while having an electrically conductive coating that is made in one piece and therefore easy to manufacture.

Preferably, the cover is assembled onto said support so as to conceal the first opening and the second opening and to reveal two separate opposed regions of the electrically conductive coating. In a preferred embodiment, the member comprises at least part of a vehicle door handle, and the cover reveals only an upper strip and a lower strip of the electrically conductive coating. The terms “upper” and “lower” relate to a positioning along the gravitational axis, where the member is used on a motor vehicle resting on horizontal ground.

The motor vehicle member may comprise, notably, at least part of a vehicle door handle, or at least part of a pillar between two side doors (referred to as a “B-pillar”), or at least part of a tailgate, or the like.

According to an aspect of the invention, the electrically conductive coating extends over a support or shell, made of plastic material for example. Said support may form a housing for the near field communication antenna, or at least one protective cover for the latter. Said support is advantageously formed in one piece, at least as regards its parts covered by the electrically conductive coating.

Preferably, but not exclusively, the support is open opposite the at least a first opening, and solid opposite the at least a second opening. In a variant, the support is open opposite the at least a first opening, and opposite the at least a second opening. According to another variant, the support is solid opposite the at least a first opening, and opposite the at least a second opening.

Advantageously, each second opening extends along a line connecting the inner edge of said at least a first opening to the outer edge of the electrically conductive coating, and each second opening has a width, defined along an axis orthogonal to said line, of at least 1 mm.

Advantageously, the electrically conductive coating comprises a first part and a second part, spaced apart from each other, and separated by said first and second openings. In this embodiment, the member according to the invention advantageously comprises two second openings, separating the first and second parts of the electrically conductive coating from each other.

According to an advantageous characteristic, said first opening takes the form of a rectangular aperture having a first width, said second opening taking the form of a slit having a second width of between 0.01 and 1.0 times the first width, the first and second widths extending parallel to each other and orthogonally to an axis, or line, joining the outer edge of the electrically conductive coating and the inner edge of the first opening.

This improves the electromagnetic coupling.

Preferably, said rectangular aperture has a first length, and said near field communication antenna comprises a plurality of turns distributed over a second length, said first length being more than 0.1 times said second length, the first and second lengths extending parallel to each other, and parallel to an axis joining the outer edge of the electrically conductive coating and the inner edge of the first opening.

Preferably, the length of said rectangular aperture is between 1.0 and 3.0 times the length of the plurality of turns, or possibly between 0.1 and 1.0 times the length of the plurality of turns, or even between 0.5 and 1.0 times the length of the plurality of turns.

Preferably, said electrically conductive coating comprises a layer of chromium and/or a layer of copper.

Preferably, said member comprises a third opening having an edge through which said second opening passes.

Preferably, said support is open opposite the first opening, and solid opposite the at least a second opening.

An aspect of the invention also relates to a motor vehicle door handle which is noteworthy in that it comprises a motor vehicle member according to an aspect of the invention.

An aspect of the invention also relates to a method of manufacturing a member according to an aspect of the invention, the method comprising the following steps:

- a step of applying a mask to an initial support;
- a step of depositing, on the initial support surmounted by said mask, a solid layer of an initial electrically conductive coating;
- a step of removing the mask, the initial coating remaining on the support after the removal of the mask, forming the electrically conductive coating of said member (10; 100; 200).

The initial support is designed to form the support of the member according to an aspect of the invention. The initial coating remaining on the initial support after the removal of the mask is designed to form the electrically conductive coating of said member.

At least one location on the initial support, covered by the mask during the deposition of the initial coating, forms the at least a second opening of the member according to an aspect of the invention.

The method according to an aspect of the invention makes it possible to produce the electrically conductive coating provided with the at least a second opening in a very simple way, by solid layer deposition.

In a first alternative, the at least a first opening is formed after the deposition of the solid layer of initial electrically conductive coating. The initial support thus pierced then forms the support of the member according to an aspect of the invention.

In a second alternative, the at least a first opening is formed before this step of depositing the solid layer of initial electrically conductive coating. The initial support, having been pierced already, then forms the support of the member according to an aspect of the invention from the beginning.

An aspect of the invention also relates to a motor vehicle comprising a member according to an aspect of the invention.

BRIEF DESCRIPTION OF THE DRAWINGS

Several embodiments of the present invention will be described hereinbelow by way of nonlimiting examples and with reference to the appended figures, in which:

FIG. 3 shows schematically, in a perspective view, a motor vehicle member according to a third embodiment of the present invention;

FIG. 4 illustrates, in the form of a flow diagram, the steps of a method according to an aspect of the invention;

FIG. 5 schematically illustrates a cover according to an aspect of the invention.

DETAILED DESCRIPTION OF EMBODIMENTS OF THE INVENTION

In all the figures, an orthonormal reference frame (Oxyz) is shown in order to clarify the description.

Figure 1:
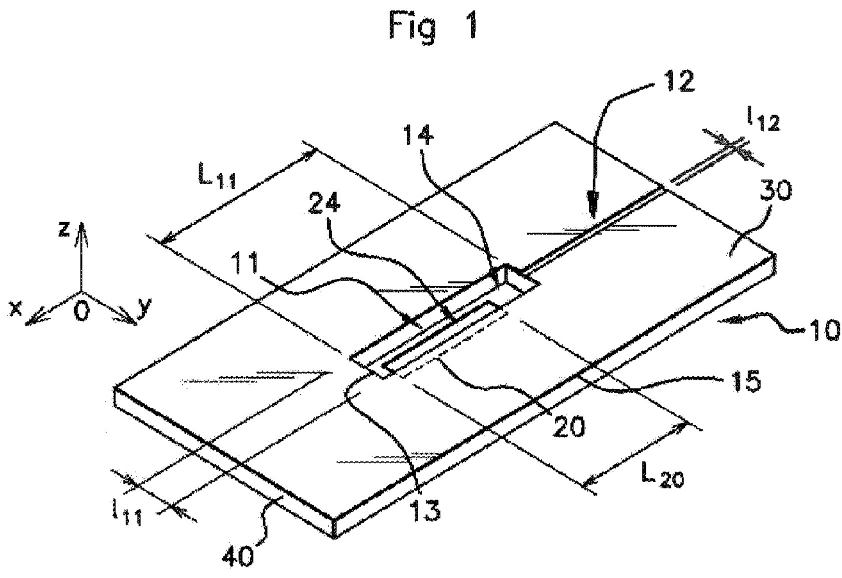
FIG. 1 shows schematically an isometric view of a motor vehicle member according to a first embodiment of the present invention.

With reference to FIG. 1, a motor vehicle member 10 is shown schematically, comprising a support 40 at least partially covered with an electrically conductive coating 30.

Here, an outer surface of the support 40 is almost entirely covered by the electrically conductive coating 30.

The electrically conductive coating 30 is designed to be at least partially visible from the outside of the motor vehicle. It may be partly covered by an opaque cover such as a trim element.

To assist in the understanding of an aspect of the invention, a support 40 and an electrically conductive coating 30 having respective rectangular shapes are shown. The electrically conductive coating 30, as well as the support 40, are not limited to a rectangular shape, and may take various forms, notably complex shapes such as those found in certain motor vehicle parts.

In a particular embodiment of the invention, the electrically conductive coating 30 comprises a layer of chromium. Preferably, the layer of chromium has a thickness of between 30 μm and 1 mm, or possibly between 100 μm and 800 μm, and even more preferably between 300 μm and 600 μm. In an alternative, the electrically conductive coating 30 comprises, on its own or in combination with another layer, a layer of copper, for example in combination with a layer of chromium. In yet another alternative, the electrically conductive coating 30 comprises a single layer of metallic material, or possibly several layers of different metallic materials. In any case, the thickness of the electrically conductive coating is advantageously between 30 μm and 2 mm, or possibly between 100 μm and 1 mm, and even more preferably between 300 μm and 600 μm.

The electrically conductive coating 30 comprises a first opening 11, or through hole. The first opening 11 is positioned at least partially facing a near field communication antenna 20.

Preferably, the support 40 comprises a through opening, or cut-out, also located opposite the near field communication antenna 20. Advantageously, and as illustrated in FIG. 1, this through opening in the support 40 has the same dimensions as said first opening 11, and is entirely superimposed on the latter.

The near field communication antenna 20 is designed to receive identification data, for the purpose of recognizing an individual having authorization to access the motor vehicle via an exchange of information with a near field communication system. The near field communication system stores a piece of individual identification information. Such as system consists, for example, of a smart card which also comprises a near field communication antenna, or a mobile phone which is also equipped with a near field communication antenna.

The near field communication antenna 20 comprises a plurality of turns (not shown) which together surround a closed surface located in a plane (Oxy). Each of said turns extends in a plane (Oxy) orthogonal to the axis (Oz). Preferably, the turns are coplanar and arranged concentrically. In a variant, the turns may be superimposed along the axis (Oz).

The turns are arranged together in a general shape having a length $L_{20}$, where said length $L_{20}$ is defined along an axis parallel to the axis Ox. In this case, although not exclusively, the turns are arranged together in a generally rectangular shape. Alternatively, the turns are arranged together in a generally circular or oval shape, or in any other shape.

Preferably, as illustrated in FIG. 1, the first opening 11 takes the form of a rectangular aperture with a length $L_{11}$ and a width $I_{11}$. The length $L_{11}$ is defined along an axis parallel to the axis Ox. The width $I_{11}$ is defined along an axis parallel to the axis Oy. Preferably, the first opening 11 extends in a plane parallel to a plane along which the near field communication antenna 20 extends.

In any case, the first opening 11 extends opposite at least part of the near field communication antenna 20.

Preferably, a projection of the first opening 11 in the plane of the near field communication antenna 20 covers at least a portion of said near field communication antenna 20, the cumulative length of said portion being at least equal to 10% of a total cumulative length of the near field communication antenna 20.

Even more preferably, a projection of the first opening 11 in the plane of the near field communication antenna 20 covers at least a portion of said near field communication antenna 20, the length of said portion being at least equal to 10% of a total length of the near field communication antenna 20, both of said lengths being defined along the same axis.

In any case, this projection covers a plurality of turns of the near field communication antenna 20.

Preferably, the length $L_{11}$ of the first opening 11 is at least equal to 0.1 times the length $L_{20}$ of the near field communication antenna 20. More preferably, the length $L_{11}$ is between 0.1 and 3 times the length $L_{20}$, and even more preferably between 0.1 and 1.5 times the length $L_{20}$.

Preferably, the first opening 11 extends in a surface area 14 at least equal to a surface area 24 in which the near field communication antenna 20 is inscribed. Preferably, the opening 11 then extends opposite the whole of the near field communication antenna 20.

In an alternative, the surface area 14 of the first opening 11 is between 0.1 and 2.0 times the surface area 24.

The greater the surface area 14, the more the electromagnetic interference due to the electrically conductive coating 30 can be reduced. The dimensions of the surface area 14 may also be based on mechanical strength requirements or esthetic considerations. In particular, for reasons of mechanical strength of the member 10, the surface area 14 (in other words, the size of the opening 11) must not be too large relative to the dimensions of the support 40.

The first opening 11 is delimited by an edge 13, called the inner edge 13 because it is located inside the electrically conductive coating 30. The electrically conductive coating 30 also has an outer edge 15.

In the embodiment shown in FIG. 1, the electrically conductive coating 30 is arranged so as to be oriented, in use, toward the outside of the motor vehicle. Conversely, the near field communication antenna 20 is arranged so as to be oriented toward the interior of the motor vehicle in use.

In use, therefore, the electrically conductive coating 30 is partially visible for an individual located outside the motor vehicle (subject to the possible presence, in a finished product, of a cover, or trim element, concealing the antenna 20, partially covering the electrically conductive coating 30, and revealing, for example, an upper part and a lower part of the electrically conductive coating 30). Such an embodiment is illustrated in FIG. 5, showing the cover 180 partially covering the electrically conductive coating while revealing an upper part 130A and a lower part 130B of the electrically conductive coating (the terms "upper" and "lower" relate to the orientation of the member in use, on a motor vehicle resting on horizontal ground).

According to an aspect of the invention, the electrically conductive coating 30 also comprises a second opening 12, extending from the inner edge 13 of the first opening 11 to the outer edge 15 of the electrically conductive coating 30. Thus the second opening 12 prevents an electric current from flowing in a loop in the electrically conductive coating 30 around the whole of the first opening 11, opposite the near field communication antenna 20.

Preferably, the support 40 is solid opposite said second opening 12. In a variant which is not shown, the support 40 comprises a through opening, exactly superimposed on said second opening.

Preferably, the second opening 12 takes the form of a slit which extends here, but not exclusively, along a straight line parallel to the axis Ox. In variants that are not shown, the slit 12 extends slantwise relative to the axis Ox. In an alternative, the slit 12 extends along the axis (Oy), perpendicularly to the length $L_{11}$. In other variants, not shown, the slit extends along a curved line, or in sawtooth forms, or in zigzags, or in any other shape. In yet further variants, the electrically conductive coating 30 comprises a plurality of slits, each extending from the inner edge 13 of the first opening 11 to the outer edge 15 of the electrically conductive coating 30.

Preferably, a width $I_{12}$ of the slit 12 is between 0.01 and 1.0 times the extent of the first opening 11, defined along the same axis, or more preferably between 0.01 and 0.5 times, or even more preferably between 0.01 and 0.2 times.

Preferably, the slit 12 has a constant width, defined, at all points, along an axis orthogonal to the line along which the slit extends from the first opening 11 to the edge of the electrically conductive coating 30. Here, the width $I_{12}$ of the slit 12 is defined along the axis Oy. If this width varies with the location concerned along the slit 12, the greatest value of this width is considered.

The extent considered, for the first opening 11, is its extent along the same axis as the axis of the width $I_{12}$ of the slit 12. Here, therefore, the extent of the first opening 11 along the axis Oy is considered. Here, therefore, the width $I_{11}$ of the aperture 11 is considered. If this extent varies along the axis Oy, the smallest value of this extent is preferably considered.

In an extreme case, the slit 12 may have a width equal to the extent of the first opening 11 along the same axis. In this case, the first opening 11 and the slit 12 together form a single rectangular opening. Advantageously, however, the slit has a width of not more than 80%, or possibly not more than 50%, of the extent of the first opening 11 defined along the same axis.

The width of the slit 12 is advantageously at least 1 mm, more preferably at least 3 mm, notably in order to prevent a re-establishment of the current flow if moisture accumulates in the slit. Preferably, the slit 12 extends only in the electrically conductive coating 30, without passing through the support. In other words, the support 40 is solid opposite said slit 12.

In an alternative, not shown, the member 10 also comprises a capacitive sensor, a Hall effect sensor and/or a piezoelectric sensor.

Figure 2:
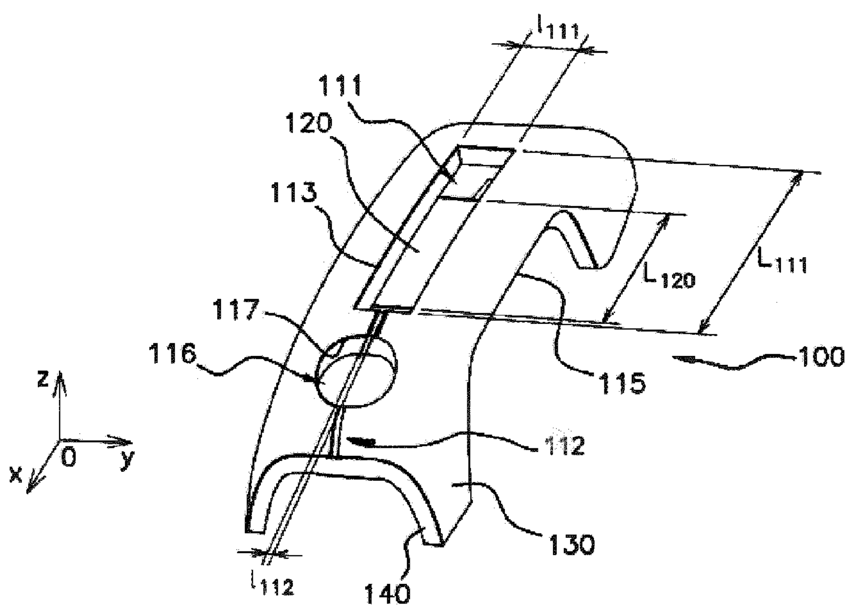
FIG. 2 shows schematically, in a perspective view, a motor vehicle member according to a second embodiment of the present invention.

FIG. 2 illustrates a second embodiment, which will be described only in terms of its differences from the embodiment of FIG. 1. The reference numerals 111, 112, 115, 120, 130 and 140 of FIG. 2 correspond to the reference numerals 11, 12, 15, 20, 30 and 40, respectively, of FIG. 1.

Thus, FIG. 2 illustrates a motor vehicle member 100 in which the electrically conductive coating 130 extends over a support formed by an outer shell 140 of a motor vehicle door handle. The outer shell is made of a plastic material, and is preferably obtained by injection molding. The outer shell 140 is covered with an electrically conductive coating 130 as described above, which is designed to be at least partially visible to an individual located outside the motor vehicle. The outer shell 140 is designed to receive a trim element (not shown) assembled by clip fitting, in order to conceal, notably, the first opening 111 and the slit 112.

Here, the electrically conductive coating 130 covers virtually all of the outer surface of the outer shell 140. "Outer" is taken to mean "located on the outside of the motor vehicle in use". In variants that are not shown, lateral edges of the outer shell 140, for example, are not covered by said electrically conductive coating 130.

In the embodiment of FIG. 2, the outer shell 140 also has a third opening 116, designed to receive a motor vehicle door lock (not shown). The third opening 116 is delimited by an edge 117. The slit 112 extends from the inner edge 113 of the first opening 111 to the outer edge 115 of the electrically conductive coating 130, passing through the third opening 116 from one side to the other.

FIG. 3 then illustrates a third embodiment, which will be described only in terms of its differences from the embodiment of FIG. 2. The reference numerals 200, 213, 215, 216, 217, 220, 224, 230 and 240 of FIG. 3 correspond to the reference numerals 100, 113, 115, 116, 117, 120, 124, 130 and 140, respectively, of FIG. 2.

In the embodiment of FIG. 3, the electrically conductive coating 230 has a first slit 212_a_ and a second slit 212_b_, positioned on either side of the first opening 211. The first and second slits 212_a_, 212_b_ help to separate the electrically conductive coating 230 into two separate parts. Thus the electrically conductive coating 230 comprises a first part

201*a* and a second part 201*b*, spaced apart from each other and also separated by the first opening 211 (and, in this example, the aperture 216).

An aspect of the invention also relates to a method of manufacturing a member according to an aspect of the invention, the method comprising the following steps, executed in this order (see FIG. 4):

a step E1 of applying a mask to an initial support, said initial support being designed to form the support of the member according to an aspect of the invention;

a step E2 of depositing, on the initial support surmounted by said mask, a solid layer of an initial electrically conductive coating;

a step E3 of removing the mask.

The initial support may be provided with at least one through opening, before step E1. The initial support then directly forms the support of the member according to an aspect of the invention. In this case, step E2 of deposition on the initial support directly forms, by construction, the first opening in the electrically conductive coating of the member according to an aspect of the invention.

In a variant, the assembly formed by the initial support and the initial coating is pierced after step E2, to form the support of the member according to an aspect of the invention together with the first opening in the electrically conductive coating.

In any case, the initial coating remaining on the initial support, after the removal of the mask and after any piercing of the initial support, forms the electrically conductive coating of the member according to an aspect of the invention.

An aspect of the invention has the advantage of reducing, or even eliminating, the electromagnetic interference associated with the electrically conductive coating extending opposite the near field communication antenna. This improves the quality, and notably the intensity, of an electromagnetic signal exchanged between the near field communication antenna and an ancillary communication means, comprising an NFC antenna and held by an individual wishing to interact with the motor vehicle.

The invention claimed is:

1. A motor vehicle member for a motor vehicle, said member comprising:

a support;

an electrically conductive coating at least partially covering said support, designed to be at least partially visible from outside of said motor vehicle, and having an outer edge; and a near field communication antenna, the electrically conductive coating comprising:

at least a first opening having an inner edge and arranged at least partially opposite the near field communication antenna; and at least a second opening, extending from the inner edge of said at least first opening to the outer edge of the electrically conductive coating, so as to prevent an electric current from flowing in the electrically conductive coating around the whole of said first opening;

the member further comprises a cover, assembled onto said support and partially covering the electrically conductive coating, so as to conceal the first opening and the second opening and to reveal at least a part of the electrically conductive coating.

2. The member as claimed in claim 1, wherein the cover is assembled onto said support so as to conceal the first opening and the second opening and to reveal two separate opposed regions of the electrically conductive coating.

3. The member as claimed in claim 2, wherein each second opening extends along a line joining the inner edge of said first opening and the outer edge of the electrically conductive coating, and in that each second opening has a width, defined along an axis orthogonal to said line, of at least 1 mm.

4. The member as claimed in claim 1, wherein each second opening extends along a line joining the inner edge of said first opening and the outer edge of the electrically conductive coating, and in that each second opening has a width, defined along an axis orthogonal to said line, of at least 1 mm.

5. The member as claimed in claim 1, wherein the electrically conductive coating comprises a first part and a second part, spaced apart from each other, and separated by said first and second openings.

6. The member as claimed in claim 1, wherein said first opening takes the form of a rectangular aperture having a first width, and in that said second opening takes the form of a slit having a second width of between 0.01 and 1.0 times the first width, the first and second widths extending parallel to each other and orthogonally to a line joining the outer edge of the electrically conductive coating and the inner edge of the first opening.

7. The member as claimed in claim 6, wherein said rectangular aperture has a first length, and in that the near field communication antenna comprises a plurality of turns extending together over a distance having a second length, said first length being more than 0.1 times said second length, the first and second lengths extending parallel to each other, and parallel to an axis joining the outer edge of the electrically conductive coating and the inner edge of the first opening.

8. The member as claimed in claim 1, wherein said electrically conductive coating comprises a layer of chromium and/or a layer of copper.

9. The member as claimed in claim 1, wherein said member comprises a third opening with an edge through which said second opening passes.

10. The member as claimed in claim 1, wherein said support is open opposite said at least a first opening, and solid opposite said at least a second opening.

11. A motor vehicle door handle, comprising a motor vehicle member as claimed in claim 1.

12. A method of manufacturing a member as claimed in claim 1, the method comprising:

applying a mask to an initial support;

depositing, on the initial support surmounted by said mask, a solid layer of an initial electrically conductive coating; and removing the mask;

the initial support being designed to form the support of said member and the initial coating remaining on the initial support after the removal of the mask being designed to form the electrically conductive coating of said member.

13. A motor vehicle comprising a member as claimed in claim 1.

* * * * *